United States Patent
Ancier

(10) Patent No.: US 7,840,897 B2
(45) Date of Patent: Nov. 23, 2010

(54) INDUCING DESIRED BEHAVIOR WITH AUTOMATIC APPLICATION OF POINTS

(75) Inventor: Leland J. Ancier, 16539 Via Lago Azul, Rancho Santa Fe, CA (US) 92067

(73) Assignee: Leland J. Ancier, Rancho Santa Fe, CA (US)

( * ) Notice: Subject to any disclaimer, the term of this patent is extended or adjusted under 35 U.S.C. 154(b) by 1169 days.

(21) Appl. No.: 10/437,204

(22) Filed: May 12, 2003

(65) Prior Publication Data

US 2004/0248070 A1 Dec. 9, 2004

(51) Int. Cl.
*G06F 3/00* (2006.01)
(52) U.S. Cl. ....................................... 715/719
(58) Field of Classification Search ................. 715/705, 715/707, 708, 709, 719, 733, 854, 978; 434/201, 434/236, 238, 322, 323, 327, 332, 335, 350, 434/338; 273/429; 705/14; 706/927
See application file for complete search history.

(56) References Cited

U.S. PATENT DOCUMENTS

| | | | | | |
|---|---|---|---|---|---|
| 5,727,950 | A | * | 3/1998 | Cook et al. | 434/350 |
| 5,743,743 | A | * | 4/1998 | Ho et al. | 434/236 |
| 5,743,746 | A | * | 4/1998 | Ho et al. | 434/332 |
| 5,854,510 | A | * | 12/1998 | Sur et al. | 257/529 |
| 5,973,683 | A | * | 10/1999 | Cragun et al. | 715/719 |
| 6,178,407 | B1 | * | 1/2001 | Lotvin et al. | 705/14 |
| 6,250,929 | B1 | * | 6/2001 | Kolb et al. | 434/238 |
| 6,275,811 | B1 | * | 8/2001 | Ginn | 705/10 |
| 6,498,920 | B1 | * | 12/2002 | Simon | 434/350 |
| 6,604,008 | B2 | * | 8/2003 | Chudley et al. | 700/92 |
| 6,722,886 | B2 | * | 4/2004 | Blumberg | 434/236 |
| 6,767,212 | B2 | * | 7/2004 | Thomas | 434/236 |
| 6,807,535 | B2 | * | 10/2004 | Goodkovsky | 706/3 |
| 2003/0036042 | A1 | * | 2/2003 | Hill | 434/236 |
| 2003/0216962 | A1 | * | 11/2003 | Heller et al. | 705/14 |
| 2004/0230549 | A1 | * | 11/2004 | Freer et al. | 706/61 |
| 2004/0245330 | A1 | * | 12/2004 | Swift et al. | 235/379 |

OTHER PUBLICATIONS

Declaration of Leland J. Ancier concerning prior art, Sep. 8, 2003.

* cited by examiner

*Primary Examiner*—Dennis-Doon Chow
*Assistant Examiner*—Le Nguyen
(74) *Attorney, Agent, or Firm*—Fenwick & West LLP

(57) ABSTRACT

Each of a plurality of desired behaviors is associated with a corresponding positive point value, and each of a plurality of undesired behaviors is associated with a corresponding negative point value. A behavior tracking manager tracks behaviors performed by a subject over a defined period of time. The behavior tracking manager automatically calculates a point total based on the behaviors performed by the subject during the defined time period. The behavior tracking manager, in a subsequent defined period of time, automatically allocates consequences to the subject based on the point total earned during the previous period of time. Each of a plurality of levels can be associated with a corresponding point cost, and the behavior tracking manager can automatically assigning an appropriate level to the subject, based on the point total earned during the previous period of time.

59 Claims, 15 Drawing Sheets

INDUCING DESIRED BEHAVIOR WITH AUTOMATIC APPLICATION OF POINTS

BACKGROUND

1. Field of Invention

The present invention relates to inducing desired behavior by a subject with the automatic application of points.

2. Background of Invention

Inducing desired behavior of subjects is important in many different contexts such as parent-child, employer-employee, mentor-protégé, trainer-trainee, doctor-patient, counselor-camper, commanding officer-soldier, teacher-student, jailer-inmate, caretaker-nursing home resident and even within the context of self-help. It is generally understood that rewarding desired behavior and punishing undesired behavior is important in achieving these ends, but the consistent execution of reward and punishment proves difficult in practice. For example, within a parent-child context, parents often have good intentions, but nonetheless reward and punish their children inconsistently, meting out different responses to similar behaviors at different times and to different children, depending upon a variety of external factors.

Furthermore, parents frequently over or under punish and/or reward. Parents often react to relatively minor undesirable behaviors with extremely harsh punishments, decided on the spot, often in anger. After such punishments are handed out, parents will typically not enforce them in their entirety. On the other side of the coin, more serious transgressions are often not met with a sufficient response, often because the parents are focused on other matters, or simply because no appropriate punishment is readily apparent to the parents. Similarly, desired behavior is often not sufficiently rewarded, or at the other extreme, over rewarded in a way not appropriately reflective of the behavior itself.

All of this leaves the children with a confused and inconsistent understanding of the relationship between their actions and the resulting rewards or punishments. Desired behavior is not induced, because the children do not learn to associate it with appropriate consequences. Of course, the same problems apply in contexts other than parent-child, such as, for example, teacher-student.

Some efforts have been made to manually assign specific consequences to behaviors. For example, teachers of young children sometimes implement manual punishment systems designed to minimize misbehavior within their classrooms. One such system, used at Ashley Falls Elementary School in San Diego, Calif., involves defining multiple color coded behavioral levels, and representing them with colored construction paper attached to the classroom wall. Chits representing the students can be attached to a default level, e.g., the green level. If a student misbehaves, their chit can be moved to lower levels, for example yellow then red. Upon commission of sufficient misbehavior, (e.g., the red level) the child can be punished, for example by being sent to the principal's office. Although such systems are generally designed to prevent misbehavior, sometimes good behavior is also rewarded, for example by providing children with inexpensive toys and such. Although useful within its limited context, such a system is not generally applicable to non-classroom situations, or even for older children. Furthermore, such a system must be manually configured and administered, which can be a labor intensive process.

Some special education programs employ a human being who monitors the behavior of the students, and updates a paper worksheet detailing their behavior. In one such system, utilized at Little Keswick School in Keswick, Virginia, all students start at the lowest level, and can be awarded higher levels based on performing desired behaviors over time. The system includes levels 1-3, and the awarding of higher levels is based on the subjective determination of an administrator. Certain privileges are associated with higher levels. The performance of undesired behavior can result in the student being demoted to a lower level, or written up for behavioral problems. This system can be used to measure the progress of special education students, but is very administratively burdensome. A person must monitor the behavior of the students full time, and manually enter all observations onto a paper form. Additionally, the behaviors, levels and privileges are not flexible, because they are all defined by the school and cannot be customized by third parties. Additionally, because the awarding of higher levels is subjective, students do not learn a direct correlation between specific behaviors and specific consequences. Furthermore, the applicable context is extremely limited.

Dr. States's Computer Parent™ Family Software pays and fines children for performing or not performing their assigned chores. Such a system is less labor intensive to use than a manual, paper system, but is still inflexible and limited in context. In addition to the narrow application context, this system only provides monetary rewards and punishments. Monetary rewards and punishments are only a narrow segment of the consequences which it is desirable to teach subjects, and thus are of limited use in inducing desired behavior. Many desired behaviors cannot be related to money, and many important rewards are not fiscal in nature.

What is needed are flexible and configurable automated methods and systems that allow application of a wide variety of rewards and punishments for consistently and effectively inducing desired behavior across a wide variety of contexts.

SUMMARY OF INVENTION

Desired behavior is induced in a subject. Each of a plurality of desired behaviors is associated with a corresponding positive point value, and each of a plurality of undesired behaviors is associated with a corresponding negative point value. A behavior tracking manager tracks desired and undesired behaviors performed by a subject over a defined period of time. The behavior tracking manager automatically calculates a point total based on the behaviors performed by the subject during the defined period of time. The behavior tracking manager, in a subsequent defined period of time, automatically allocates consequences to the subject based on the point total earned during the previous period of time. It is to be understood that a consequence can be positive (e.g., a reward) or negative (e.g., a punishment).

In some embodiments, each of a plurality of levels is associated with a corresponding point cost, and the behavior tracking manager automatically assigns an appropriate level to the subject, based on the point total earned during the previous period of time. In other embodiments, each of a plurality of privileges is associated with a corresponding point cost, and the behavior tracking manager automatically allocates specific privileges to the subject, based on the point total earned during the previous period of time.

In some embodiments, at least one desired behavior can be defined as an expected behavior. In such embodiments, the performance of expected behaviors by the subject can be tracked, and information concerning the performance of expected behaviors by the subject can be automatically output to a user.

The features and advantages described in this summary and the following detailed description are not all-inclusive, and

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1:
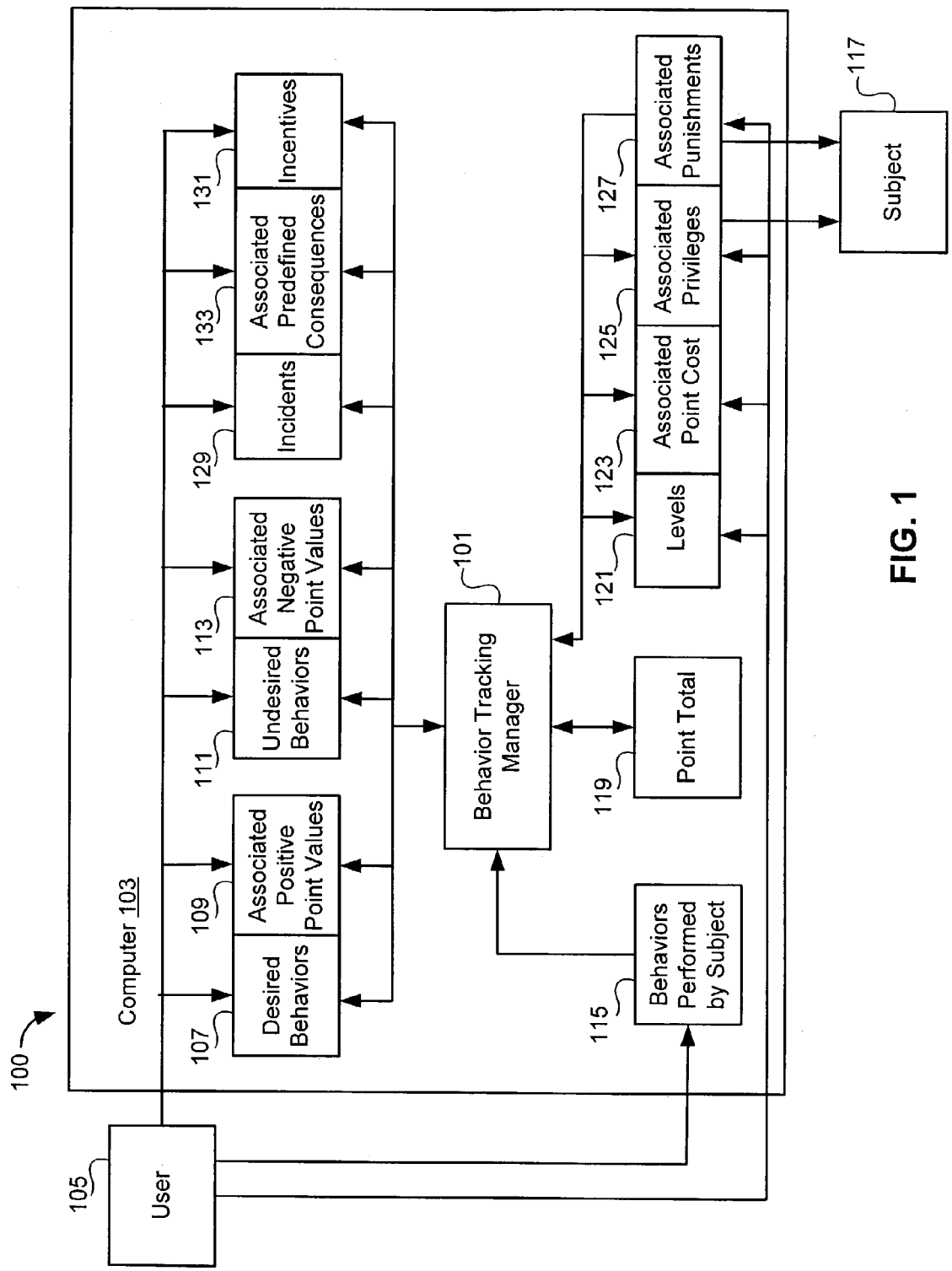
FIG. 1 is a block diagram illustrating a high level overview of a system for practicing some embodiments of the present invention.

FIG. 1 illustrates a high level overview of a system 100 for practicing some embodiments of the present invention. A behavior tracking manager 101 runs in a computer 103. It is to be understood that although the behavior tracking manager 101 is illustrated as a single entity, as the term is used herein a behavior tracking manager 101 refers to a collection of functionalities which can be implemented as software, hardware, firmware or any combination of the three. Where a behavior tracking manager 101 is implemented as software, it can be implemented as a standalone program, but can also be implemented in other ways, for example as part of a larger program, as a plurality of separate programs, or as one or more statically or dynamically linked libraries. In some embodiments the behavior tracking manager 101 is implemented as a component of a software program which can run on a user's 105 computer 103, as illustrated in FIG. 1. In other embodiments, the functionalities performed by the behavior tracking manager 101 are distributed between multiple computers 103, such as a client and a server.

Each of a plurality of desired behaviors 107 is associated with a positive point value 109. In some embodiments, some or all of the desired behaviors 107 are automatically provided by the system 100, although in some embodiments default desired behaviors 107 provided by the system 100 can be modified by the user 105 as desired. In some embodiments, some or all of the desired behaviors 107 are specified by the user 105. Likewise, positive point values 109 associated with desired behaviors 107 can be supplied by the system 100, and/or supplied and/or edited by the user 105.

The implementation mechanics for the system 100 supplying default behaviors and point values (as well as other features described below) will be readily apparent to those of ordinary skill in the relevant art in light of this specification. Likewise, the implementation mechanics for a user 105 supplying and/or editing behaviors, point values and other features will be readily apparent to ordinarily skilled artisans in light of this specification. For example, a user 105 can enter or edit features via a graphical user 105 interface, a command line or a configuration file.

Each of a plurality of undesired behaviors 111 is associated with a negative point value 113. As with the desired behaviors 107 and positive point values 109, undesired behaviors 111 and their associated negative point values 113 can be supplied by the behavior tracking manager 101, and/or supplied and/or edited by the user 105, as desired.

It is to be understood that what is defined as a desired behavior 107 and as an undesired behavior 111 is a variable design choice that can be configured by a system designer, administrator or user 105, depending upon what behavior is to be induced from whom. For example, in an embodiment in which responsibility and maturity are being taught to adolescents, examples of desired behaviors 107 could comprise taking out the garbage, washing the car and making a good dinner. In such an embodiment, examples of undesired behaviors 111 could include arguing with a parent, teasing a sibling or leaving the lights on. In some embodiments, these and other behaviors could be provided by the system 100 as defaults, whereas in other embodiments, these and other behaviors could be defined by the user 105.

It is to be understood further that the positive point values 109 associated with desired behaviors 107 and the negative point values 111 associated with undesired behaviors 113 are also variable design choices that are a function of the weight to which the user 105 or system administrator or designer wishes to assign to a given behavior. In the example embodiment discussed above, taking out the garbage could be assigned a positive point value of 1, washing the car could be assigned 2 and making a good dinner could be assigned 3, whereas arguing with a parent could be assigned −3, teasing a sibling could be assigned −2 and leaving the lights on could be assigned −1. Of course, these numbers are examples only, and other values can be used as desired. In some embodiments the system 100 provides default point values for at least some behaviors, which can be edited by the user 105. In some embodiments, the user 105 defines some or all of the point values.

Of course, the term "positive point value" as used herein does not necessitate a positive number, nor does the term "negative point value" necessitate a negative number. These terms simply indicate that some type of relative scale indicator is associated with desired behaviors 107 and undesired behaviors 111. In an embodiment in which higher numbers indicate desired behaviors 107 and lower numbers indicate undesired behaviors 111, positive and negative numbers can be used. Of course, in an embodiment in which lower numbers indicate desired behaviors 107 and higher numbers indicate undesired behaviors 111, the role of positive and negative numbers could be reversed, with the negative numbers comprising positive point values 109, and the positive numbers comprising negative point values 113. As will be readily apparent to those of ordinary skill in the relevant art, scale indicators other than numbers can also be used as positive point values 109 and negative point values 113.

The behavior tracking manager 101 tracks behaviors performed 115 by a subject 117 over a defined period of time. Typically, the user 105 will enter the performed behaviors 115, via a graphical user interface or alternatively another type of computer interface such as a command line. For example, every time a subject 117 performs a desired behavior 107 or an undesired behavior 111, the user 105 can enter an indication thereof, through an interface. It will be apparent to those of ordinary skill in the art that a wide variety of specific mechanisms for entering performed behaviors 115 are possible, all of which are within the scope of the present invention.

In some embodiments, certain behaviors are assumed to occur, and are tracked accordingly unless the user 105 specifies otherwise. For example, the user 105 can configure the system 100 such that once (or twice, or according to some other frequency) per week (or other period of time as desired), the behavior tracking manager 101 assumes that a subject 117 performs a certain desired behavior 107, e.g., taking out the garbage. If the subject 117 fails to perform such a task, the user 105 can input an indication of this failure, and the behavior tracking manager 101 will track accordingly. The implementation mechanics of tracking assumed behaviors will be apparent to those of ordinary skill in the relevant art, in light of the description above.

It is to be understood that the subject 117 (or multiple subjects 117, as discussed in greater detail below) can be anyone in whom desired behaviors 107 are to be encouraged and undesired behaviors 111 discouraged. For example, subjects 117 can be children, students, employees, trainees, patients, campers, soldiers, inmates, nursing home residents or protégés. It is to be understood further that the user 105 can be anyone who is responsible for inducing desired behavior 107 in a subject 117. For example, the user 105 can be a parent or guardian, a teacher, an employer or manager, a trainer (for example a personal fitness trainer), a doctor, a counselor, a commanding officer, a jailer, a caretaker or a mentor. The above examples of subjects 117 and users 105 are not exclusive. Other examples will be apparent to those of ordinary skill in the relevant art.

Of course, the user 105 can also be someone delegated by the person responsible for inducing desired behaviors 107. In some embodiments, the user 105 and subject 117 are the same person, and the system 100 is utilized to induce self regulated behavior modification (e.g., diet, exercise, study). The behavior tracking manager 101 utilizes the performed behaviors 115 to track desired behaviors 107 and undesired behaviors 111 performed by a subject 117 during a defined period of time. The defined period of time can be any period of time which is long enough to provide meaningful information as to the performed behaviors 115 of a subject 117, but short enough so that consequences of the performed behaviors 115 can be made apparent to the subject 117. In one embodiment, the defined period of time is one week, although of course other periods of time can be defined, for example by the user 105 or system administrator (e.g., four days, eight days, two weeks).

The behavior tracking manager 101 tracks the desired behaviors 107 and undesired behaviors 111 performed by the subject 117 during a defined period of time, and uses the associated point values 109, 113 to automatically calculate an earned point total 119 for the subject 117, based on the behaviors performed 115 during the time period. Because each desired behavior 107 is associated with a positive point value 109 and each undesired behavior 111 is associated with a negative point value 113, the behavior tracking manager 101 can consistently and automatically calculate an earned point total 119 corresponding to a subject's 117 performed behaviors 115 during a period of time. This point total 119 is used to automatically allocate consequences to the subject 117 during a subsequent period of time, as explained in more detail below.

In the embodiments illustrated by FIG. 1, the allocated consequences are in the form of the assignment of an appropriate level 121 to the subject 117. A level 121 has an associated point cost 123, (a point cost 123 associated with a level 121 can be thought of as a point threshold) and associated privileges 125 and/or associated punishments 127. In the embodiments illustrated by FIG. 1, each of a plurality of levels 121 is associated with a corresponding point cost 123 and with corresponding associated privileges 125 and/or associated punishments 127. For example, one embodiment could include five levels 121, e.g., unsatisfactory, needs improvement, meets expectations, exceeds expectations and outstanding. Levels can be given any names as desired, or simply letters or numbers or the like. The associated point cost 123 for each level 121 indicates the point total 119 that must be earned by a subject 117 during a period of time in order to be assigned a given level 121 for a subsequent period of time. The associated privileges 125 and associated punishments 127 are the consequences to allocate to the subject 117, based on the level 121 achieved. Typically, higher levels 121 will have more associated privileges 125 and fewer associated punishments 127, whereas lower levels 121 will have fewer associated privileges 125 and more associated punishments 127. Not all levels 121 need have both associated privileges 125 and punishments 127. In some embodiments, only privileges 125 or only punishments 127 are associated with some or all levels 121, as desired.

In some embodiments, default levels 121, associated point costs 123, associated privileges 125 and/or associated punishments 127 can be automatically provided by the system 100. In some embodiments default levels 121, associated point costs 123, associated privileges 125 and/or associated punishments 127 that are provided by the system 100 can be modified by the user 105 as desired. In some embodiments, some or all of the levels 121, associated point costs 123, associated privileges 125 and/or associated punishments 127 are supplied by the user 105. It is to be understood that the definitions of levels 121, associated point costs 123, associated privileges 125 and associated punishments 127 are variable design choices.

Based on the point total 119 that a subject 117 earns during a defined period of time, the behavior tracking manager 101 automatically assigns the appropriate level 121 to the subject 117 for the subsequent period of time. For example, if the defined period of time is one week and during the first week the system 100 is in use the subject 117 earns 100 points, the behavior tracking manager 101 automatically assigns the level 121 with the appropriate point cost 123 to the subject 117 for the second week. During the second week, the subject 117 enjoys the privileges 125 and/or suffers the punishments 127 associated with the earned level 121, while performing behaviors 115 to earn a point total 119 that will determine the assigned level 121 for the third week. Because the subject 117 earns specific number of points for performing specific behaviors 115, the subject 117 will tend to perform desired behaviors 107 and avoid undesired behaviors 111 in order to earn the desired higher levels 121 and enjoy their associated positive consequences. Because the consequences are experienced proximately to the performed behaviors 115, the subject 117 will learn and internalize the relationship between their behavior and the associated reward and punishment. Additionally, because each desired behavior 107, undesired behavior 111 and level 121 is associated with a specific point value 109, 113 or cost 123, the allocation of reward and punishment is consistent based on a subject's 117 performance, and is not susceptible to variance based on unrelated external factors. Additionally, the subject learns to weigh behaviors relative to each other, and to prioritize behaviors as appropriate.

As FIG. 1 also illustrates, a plurality of incidents 129 and a plurality of incentives 131 can each be associated with predefined consequences 133. Incidents 129, incentives 131 and associated predefined consequences 133 are discussed in greater detail later in this specification.

Figure 2:
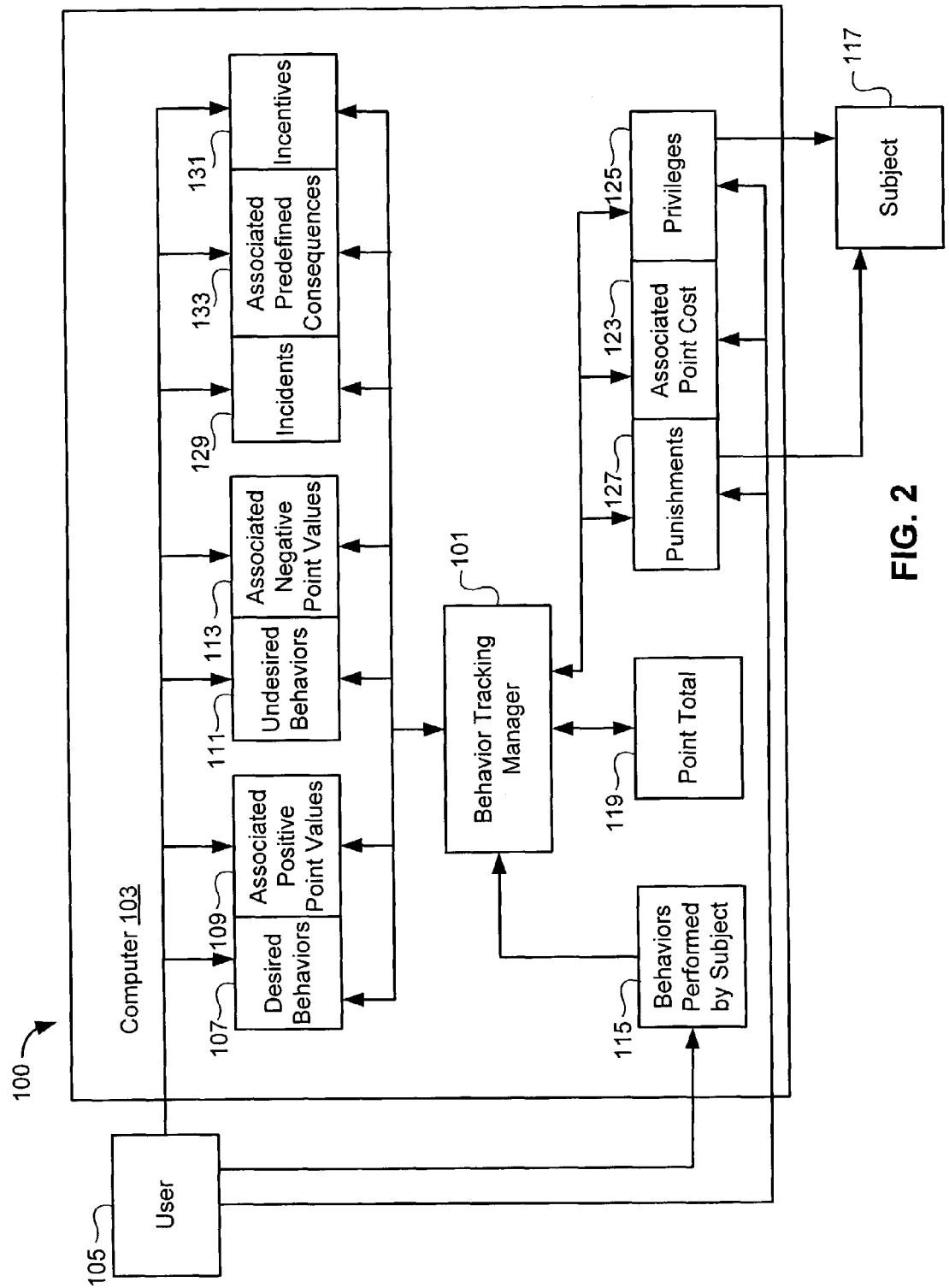
FIG. 2 is a block diagram illustrating a high level overview of a system for practicing other embodiments of the present invention.

FIG. 2 illustrates a system 100 for performing other embodiments of the present invention. In the embodiments illustrated in FIG. 2, privileges 125 are directly associated with point costs 123. In some embodiments, punishments 127 are also associated with point costs 123 (e.g., negative point totals 119). In some embodiments, the system 100 provides default definitions of privileges 125, punishments 127 and/or associated point costs 123. In some embodiments, defaults can be edited be a user 105. In some embodiments, the user 105 supplies some or all of the definitions of privileges 125, punishments 127 and/or associated point costs 123.

As described above in conjunction with FIG. 1, the behavior tracking manager 101 tracks the behaviors performed 115 by a subject 117 during a defined period of time, and automatically calculates a corresponding point total 119. Based on the earned point total 119, the behavior tracking manager 101 automatically allocates privileges 125 and/or punishments 127 to the subject 117 during the subsequent period of time. The result is similar to that of the embodiments described in conjunction with FIG. 1, except that the privileges 125 and punishments 127 are allocated directly, in a specific order, based upon their associated point costs 123 and the point total 119 earned by the subject 117. For example, if a subject 117 earns 20 points during a defined time period, during the subsequent period of time the behavior tracking manager 101 would automatically allocate privileges 125 to the subject 117 in a specific order until the earned point total 119 was exhausted. If the subject instead earns fewer or more points, different privileges 125 (or punishments 127) would be automatically allocated. Which specific privileges 125 and punishments 127 to allocate in which order is a variable design choice.

Figure 3:
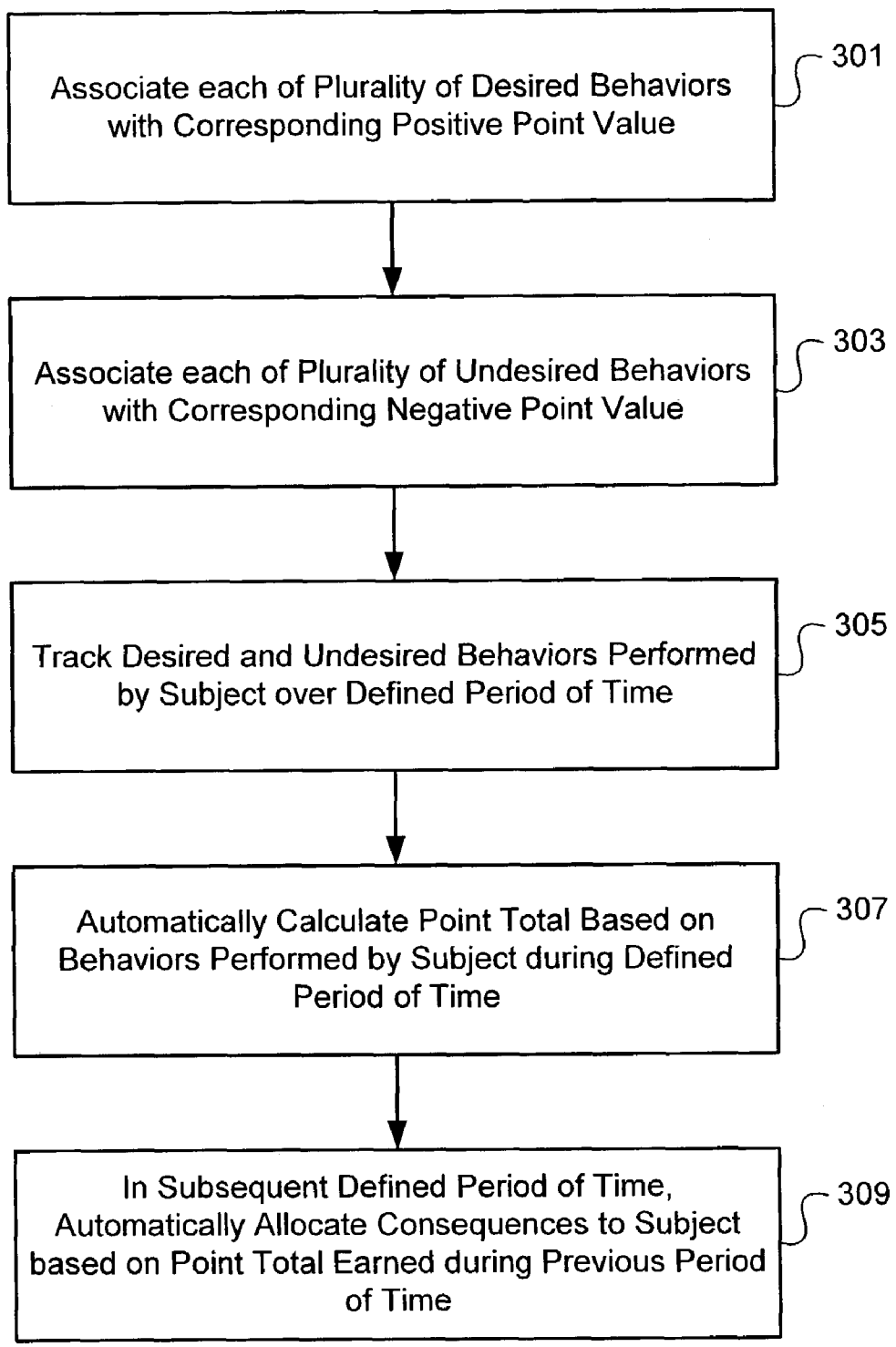
FIG. 3 is a flowchart illustrating high level steps for performing some embodiments of the present invention.

FIG. 3 illustrates steps for performing one embodiment of the present invention. Each of a plurality of desired behaviors 107 is associated 301 with a corresponding positive point value 109, and each of a plurality of undesired behaviors 111 is associated 303 with a corresponding negative point value 113. The behavior tracking manager 101 tracks 305 desired behaviors 107 and undesired behaviors 111 performed by a subject 117 over a defined period of time. The behavior tracking manager 101 automatically calculates 307 a point total 119 based on the behaviors performed 115 by the subject 117 during the defined period of time. In a subsequent defined period of time, the behavior tracking manager 101 automatically allocates 309 consequences to the subject 117, based on the point total 119 earned during the previous period of time.

Figure 4:
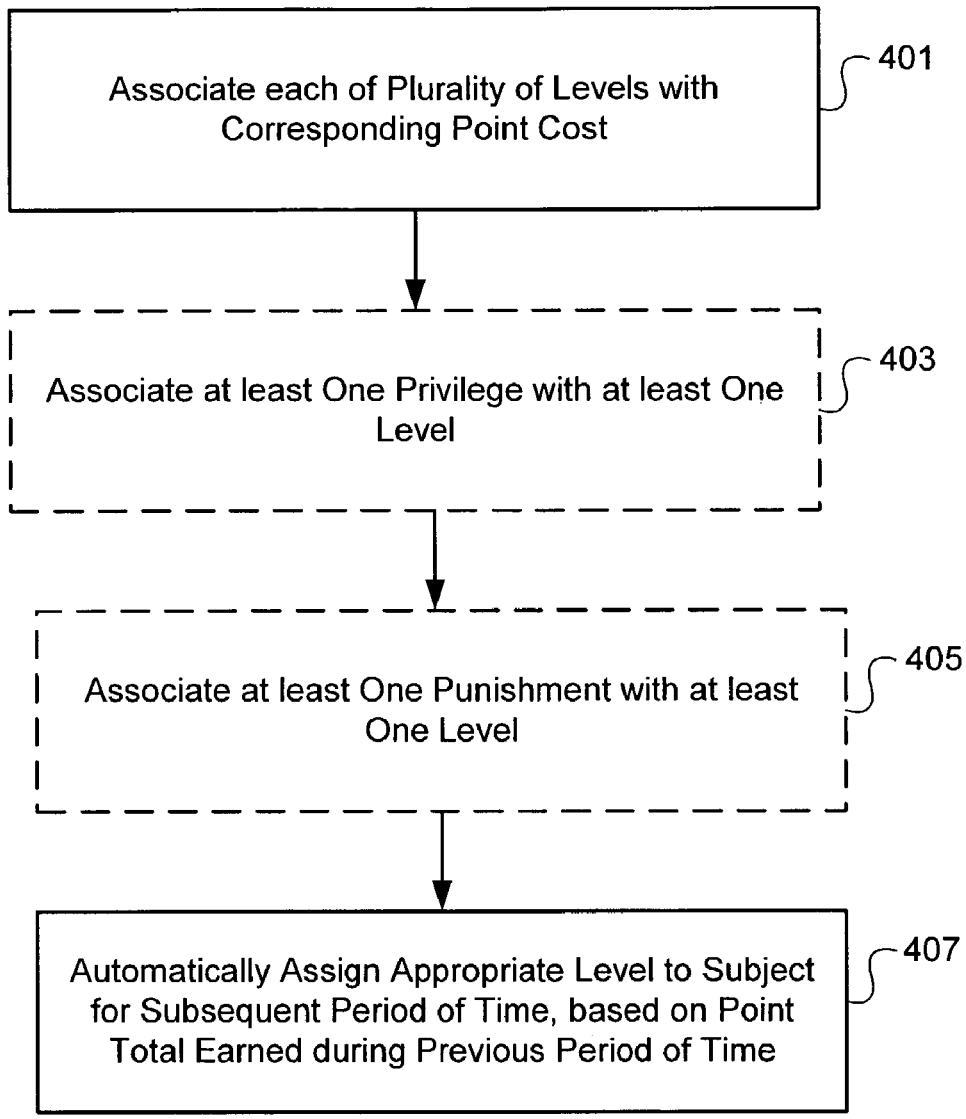
FIG. 4 is a flowchart illustrating steps for configuring and automatically allocating consequences to a subject, according to some embodiments of the present invention.

FIG. 4 illustrates steps for configuring and automatically allocating 309 consequences to a subject 117, according to some embodiments of the present invention in which levels 121 are utilized. As explained in conjunction with FIG. 1, assigning levels 121 is one form of consequence allocation which is used in some embodiments of the present invention. Turning to FIG. 4, each of plurality of levels 121 is associated 401 with a corresponding point cost 123, as discussed above in conjunction with FIG. 1. In some embodiments, at least one privilege 125 is associated 403 with at least one level 121. In some embodiments, at least one punishment 127 is associated 405 with at least one level 121. Some levels 121 are associated only with privileges 125, some only with punishments 127, and others with both privileges 125 and punishments 127, as desired. Based on the point total 119 earned by the subject 117 during a defined period of time, the behavior tracking manager 101 proceeds to automatically assign 407 the appropriate level 121 to the subject 117 for a subsequent period of time.

Figure 5:
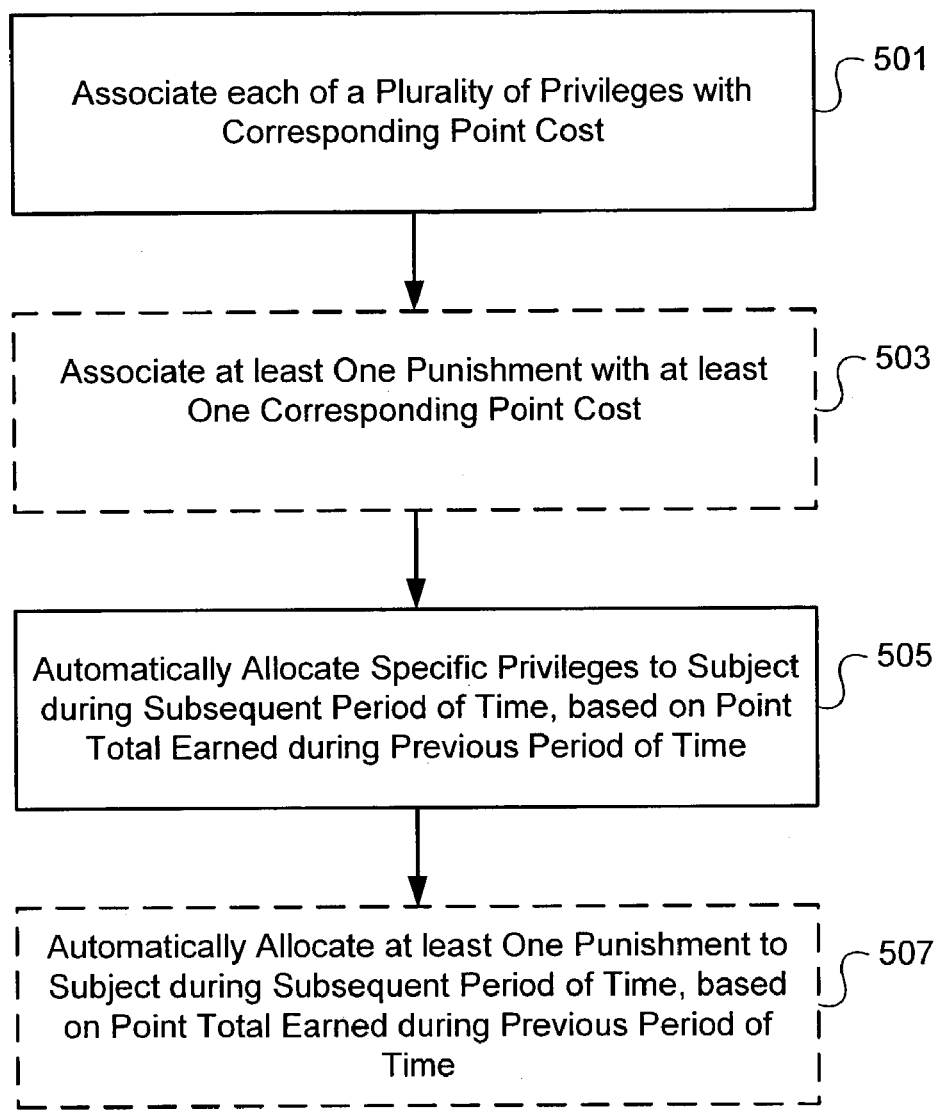
FIG. 5 is a flowchart illustrating steps for configuring and automatically allocating consequences to a subject, according to other embodiments of the present invention, in which privileges and punishments are associated with point costs directly.

FIG. 5 illustrates steps for configuring and automatically allocating 309 consequences to a subject 117, according to other embodiments of the present invention, in which privileges 125 and punishments 127 are associated with point costs 123 directly. As explained in conjunction with FIG. 2, allocating earned privileges 125 and punishments 127 is another form of consequence allocation which is used in some embodiments of the present invention. Turning to FIG. 5, each of a plurality of privileges 125 is associated 501 with a corresponding point cost 123. In some embodiments, at least one punishment 127 is also associated 503 with at least one point cost 123 (e.g., a negative point total). Based on the point total 119 earned by the subject 117 during a defined period of time, the behavior tracking manager 101 automatically allocates 505 specific privileges 125 to the subject 117 during a subsequent period of time. In some embodiments, the behavior tracking manager 101 automatically allocates 507 at least one punishment 127 to the subject 117 during a subsequent period of time, based on the point total 119 earned by the subject 117 during a defined period of time.

Figure 6:
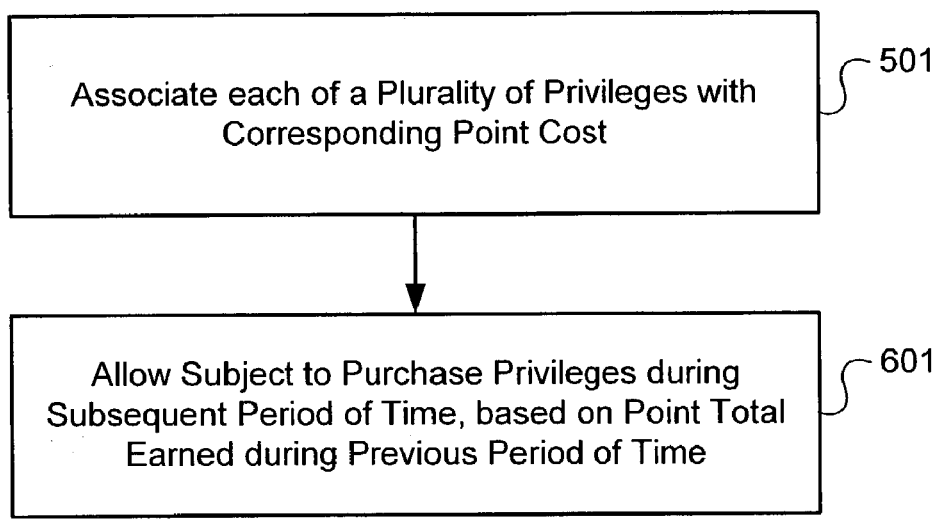
FIG. 6 is a flowchart illustrating steps for performing another embodiment of the present invention, in which privileges are allocated to a subject through a different methodology.

FIG. 6 illustrates steps for performing another embodiment of the present invention, in which privileges 125 are allocated to a subject 117 through a different methodology. In the embodiment illustrated in FIG. 6, each of a plurality of privileges 125 is associated 501 with a corresponding point cost 123, as illustrated in FIG. 5. However, rather than automatically allocating 505 specific privileges 125 to the subject 117, the subject 117 is allowed 601 to purchase privileges 125 during the subsequent time period, based on the point total 119 earned by the subject 117 during the previous defined time period. In other words, during a given defined period of time, the subject 117 earns a point total 119 as described above. Then, in the subsequent period of time, the subject 117 spends the earned point total 119 on privileges 125, each privilege 125 being associated with a corresponding point cost 123.

Figure 7:
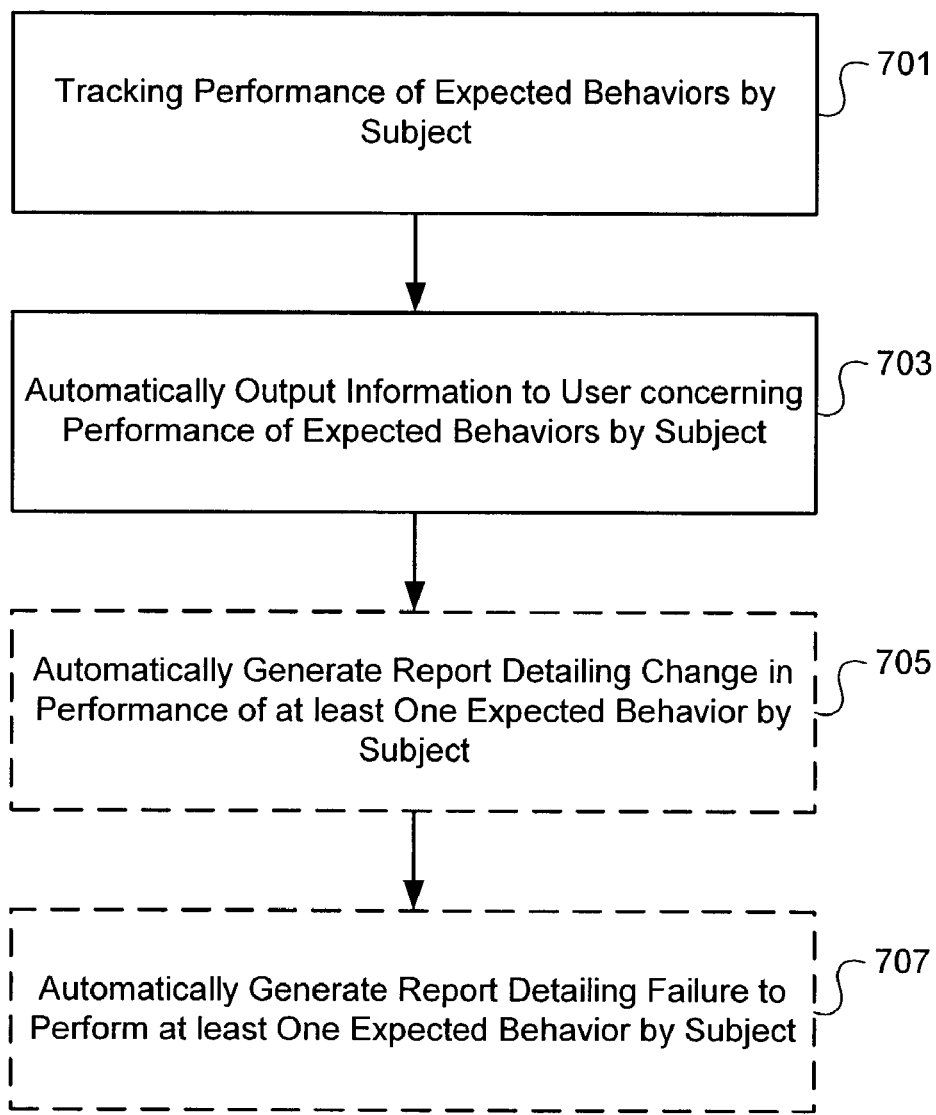
FIG. 7 is a flowchart illustrating steps for performing an embodiment of the present invention in which certain behaviors are defined as being expected behaviors.

FIG. 7 illustrates steps for performing an embodiment of the present invention in which certain behaviors are defined as expected. In some embodiments of the present invention, it is desirable to define some behaviors as being expected for a subject 117. In other words, certain behaviors are such that it is expected that a given subject 117 perform them. For example, in an embodiment in which the subjects 117 are adolescents, it may be expected that all subjects 117 take out the trash daily, maintain a B average in school and wash the car once per week. Of course, expected behaviors can be defined for individual subjects 117, or groups of subjects 117 (e.g., by age). In some embodiments, the system 100 provides default expected behaviors for some or all subjects 117. In some embodiments, default expected behaviors can be edited by users 105. In some embodiments, some or all of the expected behaviors are defined by users 105. What is defined as an expected behavior is a variable design choice.

Expected behaviors can be associated with point values 109, 113 according to the various embodiments discussed above. Thus, the assignment of levels 121, and the allocation of privileges 125 and punishments 127 can be affected by the performance (or lack there of) of expected behaviors, according to the various embodiments discussed above concerning allocation of consequences. Additionally, a user 105 will often want to monitor the performance of expected behaviors in real time. Because the behaviors are expected, the user 105 will want to know as soon as possible if a drop in their performance occurs, or if they are not being performed at all.

As illustrated in FIG. 7, the behavior tracking manager 101 tracks 701 performance of expected behaviors by the subject 117. The behavior tracking manager 101 automatically outputs 703 information to a user 105 concerning the performance of expected behaviors by the subject 117. The automatic outputting 703 of this information can be via the computer 103 screen, through a graphical user interface or via other display mechanisms as will be apparent to those of ordinary skill in the relevant art in light of this specification. The automatic outputting 703 can also comprise generating and printing a report (or writing the report to a file, or outputting it in other ways). Automatically outputting 703 this information can comprise outputting 703 information indicating that the subject 117 is or is not performing various expected behaviors, and/or information indicating that the subject 117 is increasing or decreasing the performance thereof, depending upon the subject's 117 performance. As the subject's 117 performance of expected behaviors varies with time, the behavior tracking manager 101 automatically outputs 703 current information to the user 105.

In some embodiments, the behavior tracking manager 101 automatically generates 705 a report detailing a change in the performance of at least one expected behavior by a subject 117. In other embodiments, the behavior tracking manager 101 automatically generates 707 a report detailing any failure of a subject 117 to perform at least one expected behavior.

Figure 8A:
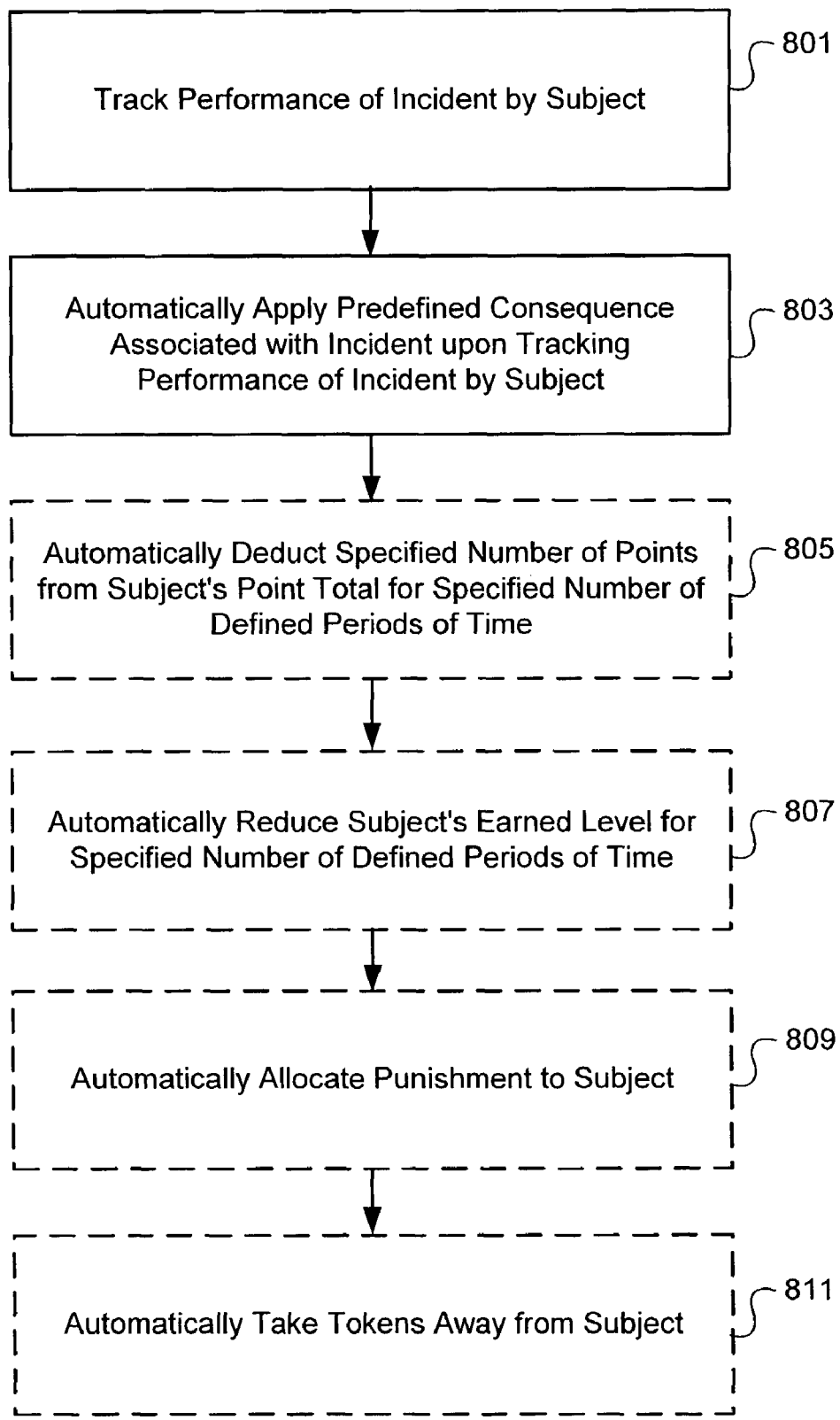
FIG. 8A is a flowchart illustrating steps for performing some embodiments of the present invention in which at least one incident is defined.

FIG. 8A illustrates steps for performing some embodiments of the present invention in which at least one incident 129 is defined. Incidents 129 comprise specially defined undesired behaviors 111 which are expected not to occur. For example, in an embodiment in which the subjects 117 are adolescents, examples of incidents 129 could be fighting and drinking alcohol.

As with ordinary undesired behaviors 111, what is defined as an incident 129 is a variable design choice that can be configured by a system designer, administrator or user 105, depending upon what behavior is to be induced from whom. In various embodiments, incidents 129 can be provided by the system 100, and/or edited and/or defined by the user 105.

Unlike ordinary undesired behaviors 111, those behaviors which are defined as incidents 129 are associated with predefined consequences 133, rather than negative point values 113. A predefined consequence 133 can be anything which it is deemed appropriate to allocate to a subject 117 in response for an incident 129. Unlike ordinary punishments 127, predefined consequences 133 are typically applied when the associated incident 129 is tracked, as opposed to during the subsequent defined period of time. Additionally, predefined consequences 133 can be applied for more than one defined time period. Essentially, an incident 129 can be thought of as the breaking of a rule. The consequences for breaking the rule are typically applied right away, rather than during a subsequent time period.

Some examples of predefined consequences 133 are deducting a specified number of points for the subject's 117 point total 119 for a specified number of defined time periods, reducing a subject's 117 earned level 121 for a specified number of defined time periods, and allocating a specific punishment 127 to the subject 177 upon detection of the incident 129. Of course, these examples are non-exclusive, and other examples will be apparent to those of ordinary skill in the relevant art. Which predefined consequences 133 to associate with which incidents 129 are a variable design choice. Of course, predefined consequences 133 can be provided by the system 100 as defaults, and predefined consequences 133 can be edited and/or defined by the user 105.

As illustrated in FIG. 8A, the behavior tracking manager 101 tracks 801 performance of incidents 129 by a subject 117. The behavior tracking manager 101 automatically applies 803 a predefined consequence 133 associated with the incident 129 upon tracking 801 performance of the incident 129 by the subject 117. In some embodiments, automatically applying 803 a predefined consequence 133 associated with the incident 129 comprises automatically deducting 805 a specified number of points from the subject's 117 point total 119 for a specified number of defined periods of time. For example, in one embodiment twenty points could be deducted 805 from the subject's 117 point total 119 for ten defined time periods (e.g., ten weeks). In some embodiments, automatically applying 803 a predefined consequence 133 associated with the incident 129 comprises automatically reducing 807 a subject's 117 earned level 121 for a specified number of defined periods of time. For example, in one embodiment the subject's 117 earned level 121 could automatically be decremented 807 by one for three defined time periods. In yet other embodiments, automatically applying 803 a predefined consequence 133 associated with the incident 129 comprises automatically allocating 809 a punishment 127 to the subject 117 (e.g., banning a specific activity, or banning visits with a specific friend). In another embodiment, automatically applying 803 a predefined consequence 133 associated with the incident 129 comprises automatically taking away 811 tokens from the subject. Of course, other predefined consequences 133 are applied 803 in other embodiments.

Figure 8B:
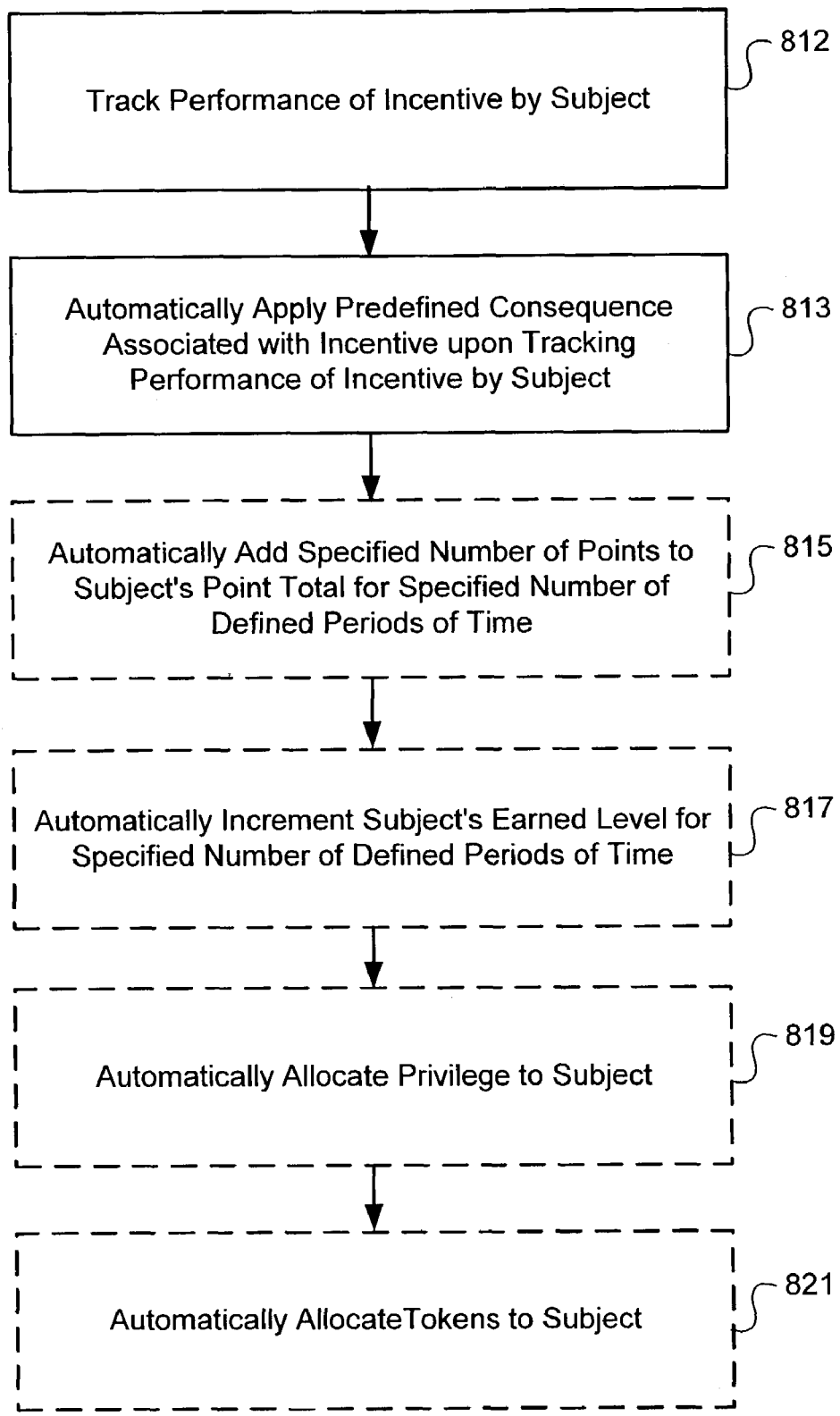
FIG. 8B is a flowchart illustrating steps for performing some embodiments of the present invention in which at least one incentive is defined.

FIG. 8B illustrates steps for performing some embodiments of the present invention in which at least one incentive 131 is defined. Incentives 131 are similar to incidents 129, except that incentives 131 comprise specially defined desired behaviors 107 which are not expected to occur, and are not necessarily time based in their performance or consequence allocation. For example, in an embodiment in which the subjects 117 are adolescents, examples of incentives 131 could be cleaning the attic, planting a vegetable garden and earning straight A's in school. These are all desired behaviors 107, but are not behaviors that would occur each time period (e.g., weekly).

As with ordinary desired behaviors 107, what is defined as an incentive 131 is a variable design choice that can be configured by a system designer, administrator or user 105, depending upon what behavior is to be induced from whom. In various embodiments, incentives 131 can be provided by the system 100, and/or edited and/or defined by the user 105.

Unlike ordinary desired behaviors 107, those behaviors which are defined as incentives 131 are associated with pre-defined consequences 133, rather than positive point values 113. A predefined consequences 133 can be anything which it is deemed appropriate to allocate to a subject 117 in response for an incentive 131. Unlike ordinary privileges 125, such predefined consequences 133 are typically applied when the associated incentive 131 is tracked, as opposed to during the subsequent defined period of time. Additionally, predefined consequences 133 can be applied for more than one defined time period. Essentially, an incentive 131 can be though of as the performance of a non-time-based desired behavior 107. Thus, the consequences are typically applied right away, rather than during a subsequent time period.

Some examples of predefined consequences 133 are adding a specified number of points to the subject's 117 point total 119 for a specified number of defined time periods, increasing a subject's 117 earned level 121 for a specified number of defined time periods, and allocating a specific privilege 125 to the subject 117 upon detection of the performance of the incentive 131. Of course, these examples are non-exclusive, and other examples will be apparent to those of ordinary skill in the relevant art. Which predefined consequences 133 to associate with which incentives 131 are a variable design choice. Of course, predefined consequences 133 can be provided by the system 100 as defaults, and predefined consequences 133 can be edited and/or defined by the user 105.

As illustrated in FIG. 8B, the behavior tracking manager 101 tracks 812 performance of incentives 131 by a subject 117. The behavior tracking manager 101 automatically applies 813 a predefined consequence 133 associated with the incentive 131 upon tracking 801 performance of the incentive 131 by the subject 117. In some embodiments, automatically applying 813 a predefined consequence 133 associated with the incentive 131 comprises automatically adding 815 a specified number of points to the subject's 117 point total 119 for a specified number of defined periods of time. For example, in one embodiment ten points could be added 815 to the subject's 117 point total 119 for three defined time periods (e.g., three weeks). In some embodiments, automatically applying 813 a predefined consequence 133 associated with the incentive 131 comprises automatically incrementing 817 a subject's 117 earned level 121 for a specified number of defined periods of time. For example, in one embodiment the subject's 117 earned level 121 could be automatically incremented 817 by one for two defined time periods. In yet other embodiments, automatically applying 813 a predefined consequence 133 associated with the incentive 131 comprises automatically allocating 809 a privilege 125 to the subject 117. In another embodiment, automatically applying 813 a predefined consequence 133 associated with the incentive 131 comprises automatically allocating 821 tokens to the subject.

Figure 9:
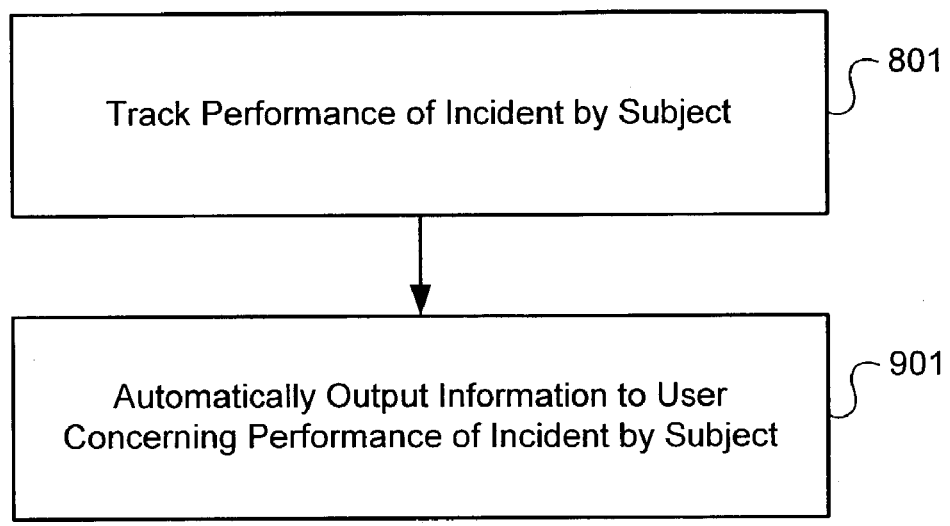
FIG. 9 is a flowchart illustrating steps for outputting information concerning incidents to the user, according to one embodiment of the present invention.

Returning to the discussion of incidents 129, because a subject 117 is expected to avoid incidents 129, the user 105 will often want to be informed of the tracking 801 of any incidents 129 in real time. FIG. 9 illustrates steps for outputting information concerning incidents 129 to the user 105, according to one embodiment of the present invention. The behavior tracking manager 101 tracks 801 performance of incidents 129 by a subject 117. The behavior tracking manager101 proceeds to automatically output 901 information to a user 105 concerning the performance of the incident 129 by a subject 117. The automatic outputting 901 of this information can be via the computer 103 screen, through a graphical user 105 interface or via other display mechanisms as will be apparent to those of ordinary skill in the relevant art in light of this specification. The automatic outputting 901 can also comprise generating and printing a report (or writing the report to a file, or outputting it in other ways). Automatically outputting 901 this information can comprise outputting 901 information indicating that the subject 117 has performed an incident 129, as well as specific information concerning the nature and/or performance of the incident 129 as desired. As the subject's 117 performance of incidents 129 are tracked 801, the behavior tracking manager 101 automatically outputs 901 current information to the user 105. In other embodiments, information concerning incentives 131 can be automatically output in a similar manner.

In some embodiments, tokens are awarded to the subject 117, based either on the level 121 achieved or points earned. Tokens are a virtual currency which can be redeemed by the subject 177 for privileges 125 or rewards. Tokens teach subjects 117 the concepts of savings and choice. By performing desired behaviors 107, a subject 117 can earn tokens, save the tokens and spend the tokens as desired. How many tokens to allocate at which level 121 or for which point total 119 is a variable design choice. Although in many embodiments tokens are a virtual currency, kept track of by the behavior tracking manager 101, in some embodiments the user 105 can provide the subject 117 with corresponding physical tokens, if desired. In other embodiments, earned points are themselves the tokens, and can be converted into a cash value (e.g., an allowance), which is then paid to the subject 117 by the user 105.

Figure 10:
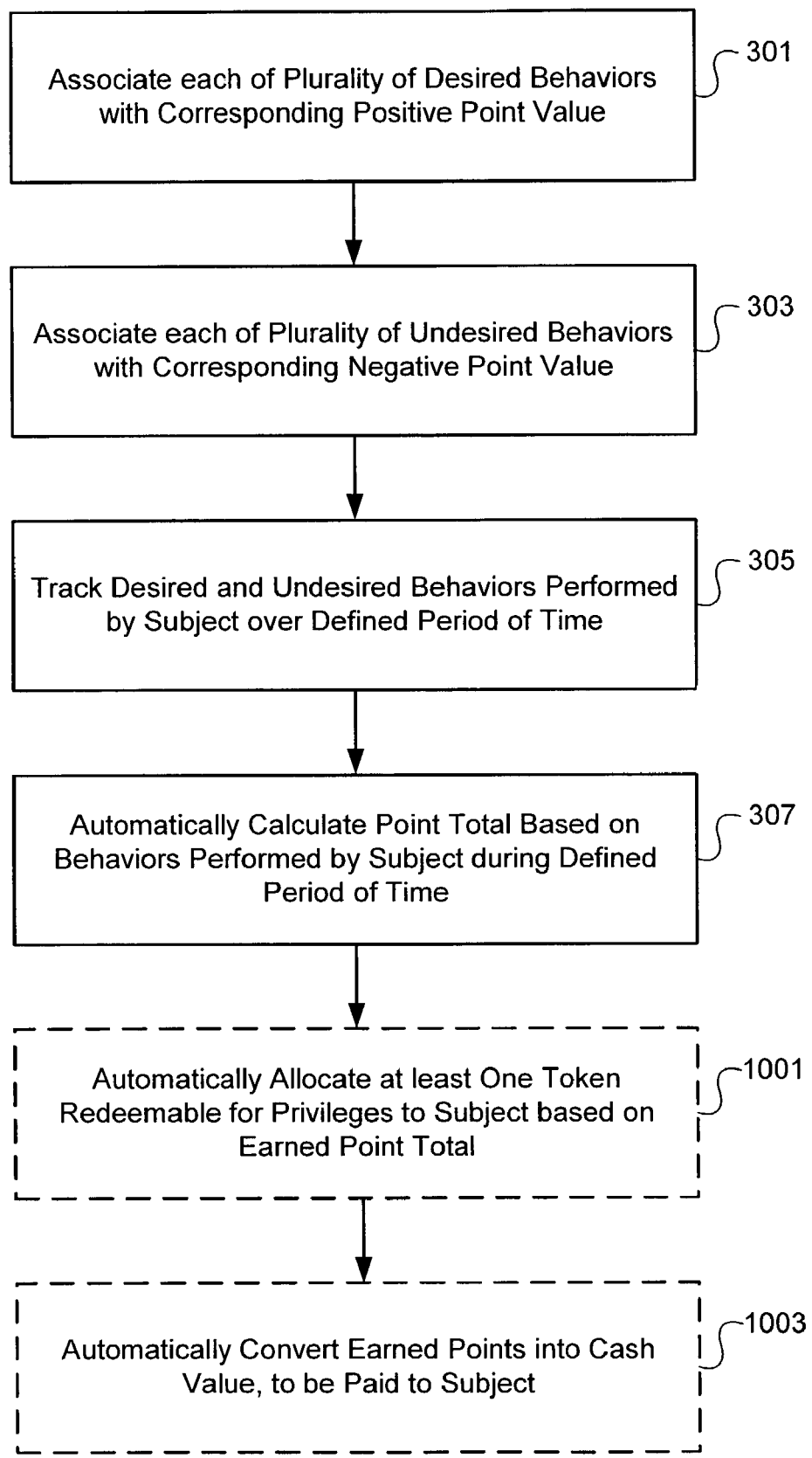
FIG. 10 is a flowchart illustrating steps for allocating tokens to a subject based on an earned point total, according to some embodiments of the present invention.

FIG. 10 illustrates steps for allocating tokens to a subject 117 based on earned point total 119, according to some embodiments of the present invention. As described in FIG. 3, each of a plurality of desired behaviors 107 is associated 301 with a corresponding positive point value 109, and each of a plurality of undesired behaviors 111 is associated 303 with a corresponding negative point value 113. The behavior tracking manager 101 tracks 305 desired behaviors 107 and undesired behaviors 111 performed by a subject 117 over a defined period of time. The behavior tracking manager 101 automatically calculates 307 a point total 119 based on the behaviors performed 115 by the subject 117 during the defined period of time.

Figure 11:
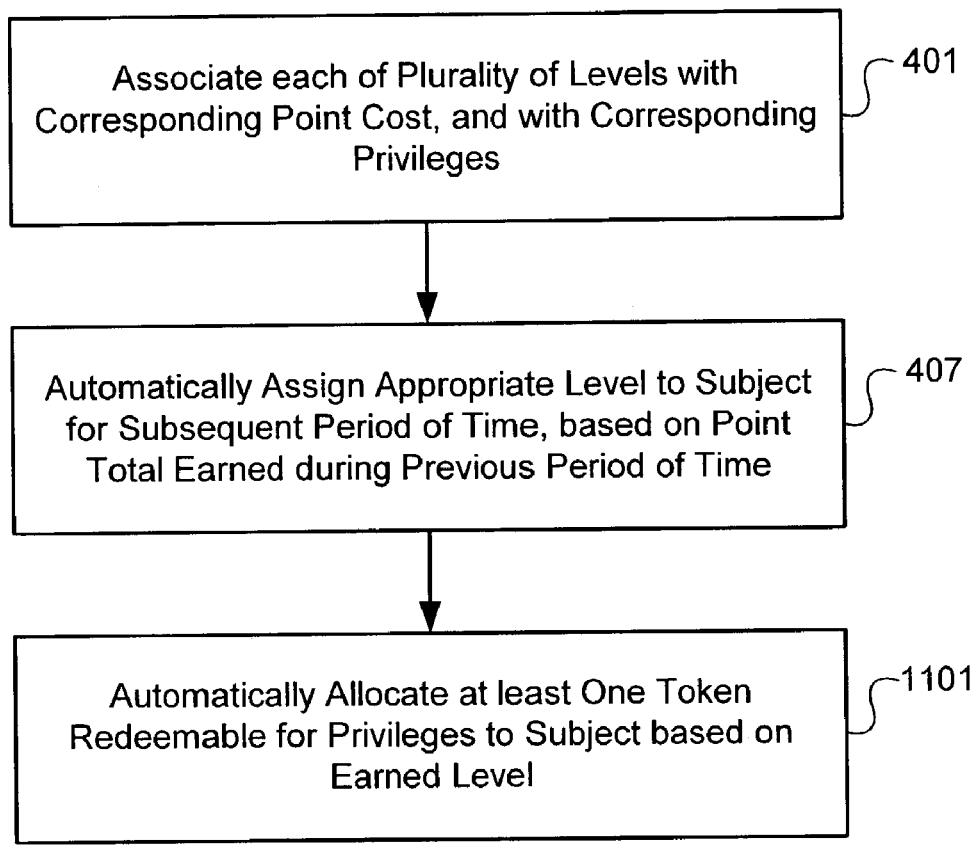
FIG. 11 is a flowchart illustrating steps for allocating tokens to a subject based on an earned level, according to other embodiments of the present invention.

Then, in some embodiments the behavior tracking manager 101 automatically allocates 1001 at least one token to the subject 117 based on the subject's 117 earned point total 119. The subject 117 can save the token(s), or redeem the token(s) for privileges 125 or rewards when desired. In some embodiment, the behavior tracking manager 101 automatically converts 1003 earned points into a cash value, which is then paid to the subject 117 by the user 105. In some embodiments, the subject can use tokens to purchase specific, one time rewards, such as the receipt of a skateboard, or a trip to an amusement park. FIG. 11 illustrates steps for allocating tokens to a subject 117 based on earned level 121, according to other embodiments of the present invention. As described in FIG. 4, each of plurality of levels 121 is associated 401 with a corresponding point cost 123. Based on the point total 119 earned by the subject 117 during a defined period of time, the behavior tracking manager 101 proceeds to automatically assign 407 the appropriate level 121 to the subject 117 for a subsequent period of time. Then, the behavior tracking manager 101 automatically allocates 1101 at least one redeemable token 125 to the subject 117 based on the earned level 121.

Figure 12:
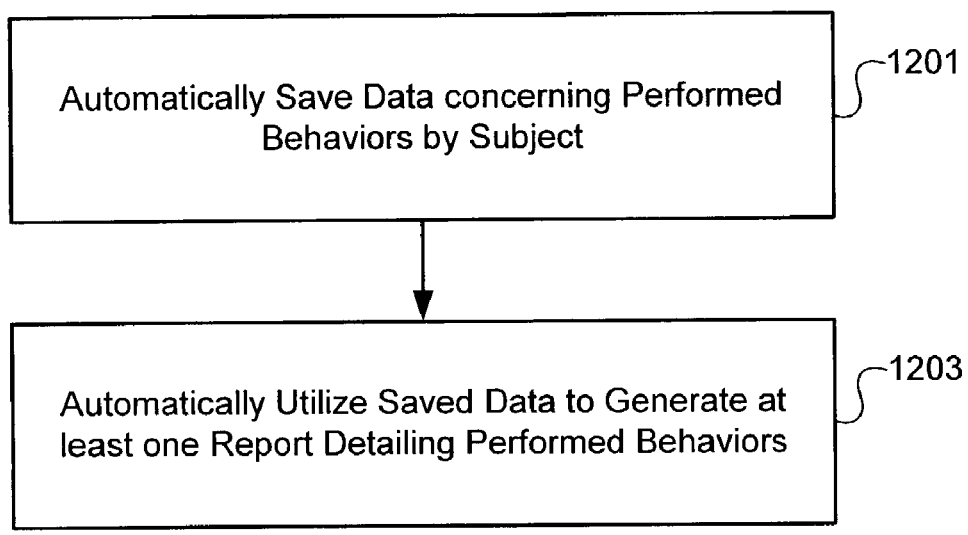
FIG. 12 is a flowchart illustrating steps for generating reports, according to some embodiments of the present invention.

As described above, it is sometimes desirable for the user 105 to see reports detailing the performance of a subject 117. Reports were discussed above in the context of expected behaviors and incidents 129, but sometimes a user 105 will want to see a report detailing the performance of a subject 117 even where no expected behaviors or incidents 129 are involved. FIG. 12 illustrates steps for generating such reports, according to some embodiments of the present invention. The behavior tracking manager 101 automatically saves 1201 data concerning performed behaviors 115 by at least one subject 117. In other words, as the behavior tracking manager 101 tracks 305 desired behaviors 107 and undesired behaviors 111 performed by a subject 117, the behavior tracking manager 101 saves data documenting such performance. The implementation mechanics of saving data will be readily apparent to one of ordinary skill in the relevant art. When desired, the behavior tracking manager 101 automatically utilizes 1203 saved data to generate at least one report detailing performed behaviors 115 by at least one subject 117.

Performed behaviors 115 of multiple subjects 117 can be tracked according to any of the embodiments described herein. Desired behaviors 107, undesired behaviors 111, expected behaviors, incidents 129, incentives 131 and other features of the present invention can be defined individually for each subject, and/or commonly to multiple subjects 117 as desired. In some cases, it will be desirable for behaviors and other features to be defined as common to multiple subjects 117 (e.g., it is desirable for all children to be thrifty, it is undesirable for all children to steal, and all children who are ten years old are expected to clean their room). In other cases, it is desirable to define behaviors and other features individually for specific subjects 117 (e.g., it is desirable for Christine to sit still for ten minutes, it is considered an incident 129 for Billy to curse at his sister).

Figure 13:
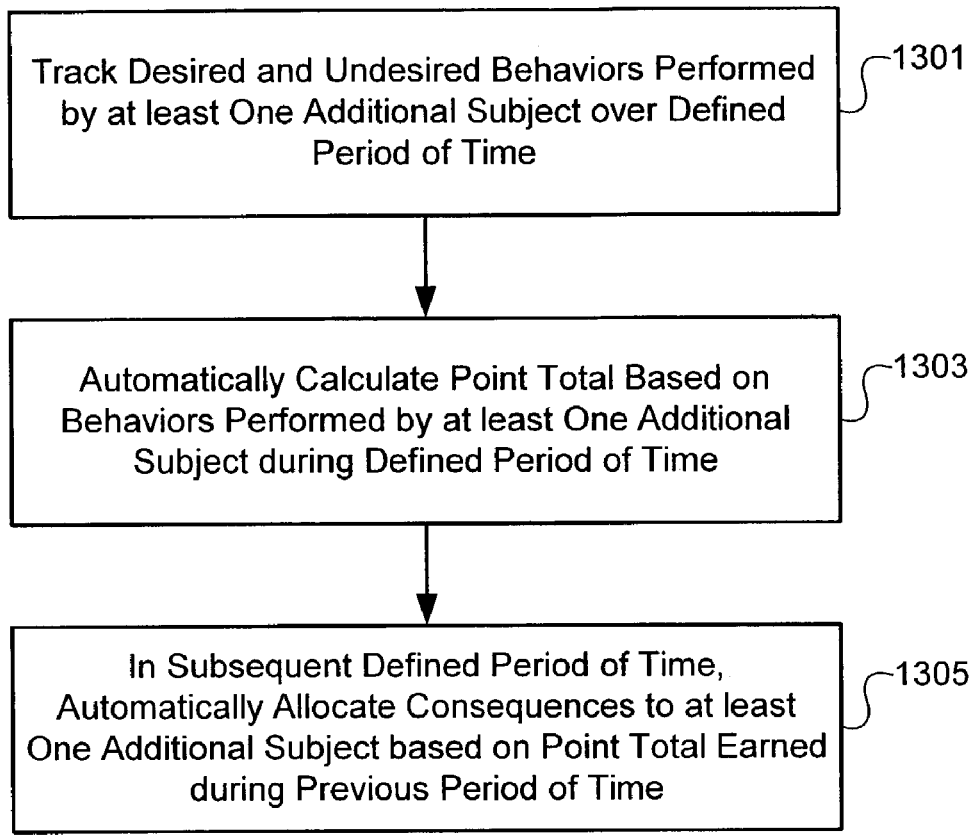
FIG. 13 is a flowchart illustrating high level steps for tracking performed behaviors for multiple subjects, according to some embodiments of the present invention.

FIG. 13 illustrates high level steps for tracking performed behaviors 115 for multiple subjects 117, according to some embodiments of the present invention. The behavior tracking manager 101 tracks 1301 desired behaviors 107 and undesired behaviors 111 performed by at least one additional subject 117 over a defined period of time. The behavior tracking manager 101 automatically calculates 1303 a point total 119 based on the behaviors performed 115 by at least one additional subject 117 during the defined period of time. In a subsequent defined period of time, the behavior tracking manager 101 automatically allocates 1305 consequences to at least one additional subject 117 based on the point total 119 earned during the previous period of time.

Figure 14:
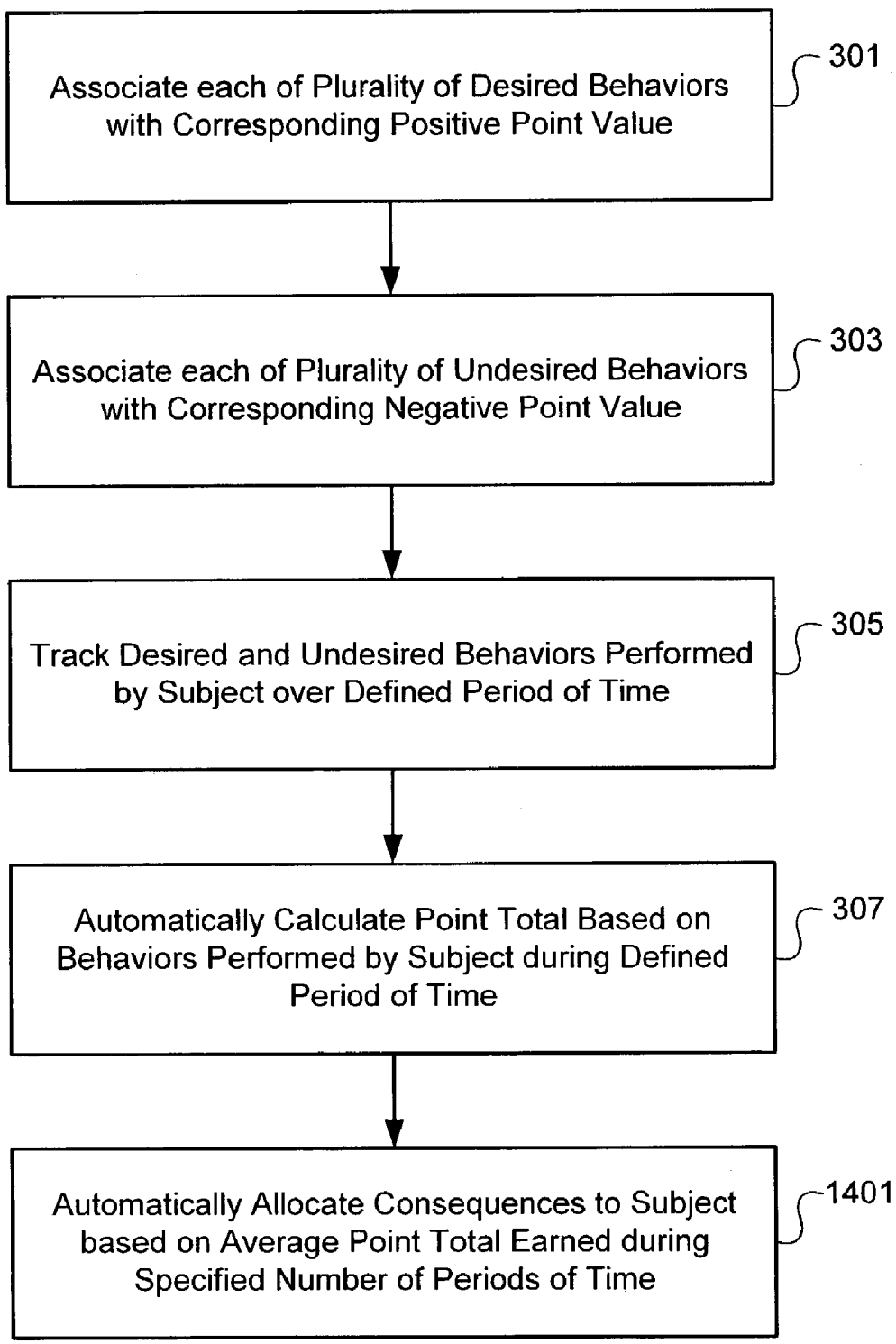
FIG. 14 is a flowchart illustrating steps for performing another embodiment of the present invention.

In some embodiments, consequences are allocated to subjects 117 over time in ways other than during a subsequent time period. FIG. 14 illustrates steps for performing one such embodiment. As described in conjunction with FIG. 3, each of a plurality of desired behaviors 107 is associated 301 with a corresponding positive point value 109, and each of a plurality of undesired behaviors 111 is associated 303 with a corresponding negative point value 113. The behavior tracking manager 101 tracks 305 desired behaviors 107 and undesired behaviors 111 performed by a subject 117 over a defined period of time. The behavior tracking manager 101 automatically calculates 307 a point total 119 based on the behaviors performed 115 by the subject 117 during the defined period of time. Then, the behavior tracking manager 101 automatically allocates 1401 consequences (e.g., assigns levels 121, allocates privileges 125 and/or punishments 127) to a subject 117 based on the average point total 119 earned by the subject 117 during a specified number of periods of time. The specific number of periods of time to utilize is a variable design choice.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer 103 programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for inducing desired physical tasks in a subject, the method comprising:

associating at least one desired physical task with a corresponding positive point value;

associating at least one undesired physical task with a corresponding negative point value;

associating a first point threshold with a plurality of positive reward based consequences;

associating a second point threshold with a plurality of negative punishment based consequences;

tracking desired physical tasks and undesired physical tasks performed by a subject over a fixed period of time;

automatically calculating a single point total based on the desired physical tasks and the undesired physical tasks performed by the subject during the fixed period of time; and after the fixed period of time, automatically allocating a consequence to the subject based on the single point total for the fixed period of time, wherein the consequence is allocated responsive to a relationship between the single point total and at least one of the first point threshold and the second point threshold.

2. The method of claim 1 wherein automatically allocating consequences to the subject based on the single point total further comprises:

associating each of a plurality of levels with a corresponding point cost; and automatically assigning an appropriate level to the subject for the subsequent period of time, based on the single point total earned during the previous period of time.

3. The method of claim 1 further comprising:
associating at least one privilege with a corresponding point cost.

4. The method of claim 3 wherein automatically allocating consequences to the subject based on the single point total further comprises:
automatically allocating specific privileges to the subject after the fixed period of time, based on the single point total earned during the fixed period of time.

5. The method of claim 3 wherein automatically allocating consequences to the subject based on the single point total further comprises:
allowing the subject to purchase privileges after the fixed period of time, based on the single point total earned during the fixed period of time.

6. The method of claim 1 further comprising automatically providing at least one default feature from a group of default features comprising:
a default desired physical task;
a default undesired physical task;
a default positive point value associated with a desired physical task; and
a default negative point value associated with an undesired physical task.

7. The method of claim 6 further comprising receiving, from a user, at least one modification to at least one provided default feature from a group of default features comprising:
a default desired physical task;
a default undesired physical task;
a default positive point value associated with a desired physical task; and
a default negative point value associated with an undesired physical task.

8. The method of claim 1 further comprising receiving, from a user, at least one user defined feature from a group of user defined features comprising:
a user defined desired physical task;
a user defined undesired physical task;
a user defined positive point value associated with a desired physical task; and
a user defined negative point value associated with an undesired physical task.

9. The method of claim 2 further comprising:
associating at least one privilege with at least one level.

10. The method of claim 3 or claim 9 further comprising:
automatically providing at least one default privilege.

11. The method of claim 10 further comprising:
receiving, from a user, at least one modification to at least one provided default privilege.

12. The method of claim 3 or claim 9 further comprising:
receiving, from a user, at least one user defined privilege.

13. The method of claim 1 wherein:
the fixed period of time period comprises one week.

14. The method of claim 1 wherein:
at least one desired physical task comprises an expected physical task.

15. The method of claim 14 further comprising:
tracking performance of expected physical tasks by the subject; and
automatically outputting information to a user concerning the performance of expected physical tasks by the subject.

16. The method of claim 15 further comprising:
automatically generating a report detailing a change in performance of at least one expected physical task by the subject.

17. The method of claim 15 further comprising:
automatically generating a report detailing a failure to perform at least one expected physical task by the subject.

18. The method of claim 1 wherein:
at least one undesired physical task comprises an incident, with which a predefined consequence is associated.

19. The method of claim 18 further comprising:
tracking performance of an incident by the subject; and
automatically outputting information to a user concerning the performance of the incident by the subject.

20. The method of claim 18 wherein:
at least one predefined consequence associated with at least one incident comprises automatically deducting a specified number of points from the subject's single point total for a specified number of fixed periods of time.

21. The method of claim 18 wherein:
at least one predefined consequence associated with at least one incident comprises automatically reducing a subject's earned level for a specified number of fixed periods of time.

22. The method of claim 18 further comprising:
tracking performance of an incident by the subject; and
automatically applying a predefined consequence associated with the incident upon tracking performance of the incident by the subject.

23. The method of claim 22 further comprising:
automatically applying a predefined consequence associated with the incident for at least two fixed periods of times, responsive to the performance of the incident by the subject.

24. The method of claim 18 wherein:
at least one predefined consequence associated with at least one incident comprises automatically allocating a punishment to the subject.

25. The method of claim 1 further comprising:
automatically converting earned points into a cash value, to be paid to the subject.

26. The method of claim 1 further comprising:
automatically allocating at least one redeemable token to the subject based on the calculated single point total.

27. The method of claim 2 further comprising:
automatically allocating at least one redeemable token to the subject based on the assigned level.

28. The method of claim 1 further comprising:
generating at least one report to a user detailing performed behaviors by at least one subject.

29. The method of claim 28 further comprising:
automatically saving data concerning performed physical tasks by at least one subject; and
automatically utilizing saved data to generate at least one report detailing performed physical tasks by at least one subject.

30. The method of claim 1 wherein the subject is one from a group of subjects comprising:
a child;
an employee;
a protégé;
a student;
a patient;
a camper;
an inmate;
a nursing home resident;
a user; a soldier; and
a trainee.

31. The method of claim 1 further comprising:
tracking desired and undesired physical tasks performed by at least one additional subject over the fixed period of time;
automatically calculating a single point total based on the physical tasks-performed by at least one additional subject during the fixed period of time;
after the fixed period of time, automatically allocating a consequence to the at least one additional subject based on single the point total earned during the fixed period of time, wherein the consequence is allocated responsive to a relationship between the single point total and at least one of the first point threshold and the second point threshold.

32. The method of claim 31 wherein:
at least one physical task comprises a common behavior, to be utilized in conjunction with at least two subjects.

33. The method of claim 2 further comprising:
associating at least one punishment with at least one level.

34. The method of claim 1 further comprising:
associating at least one punishment with at least one point cost.

35. The method of claim 34 further comprising:
automatically allocating at least one punishment to the subject after the fixed period of time, based on the single point total earned during the fixed period of time.

36. The method of claim 33 or claim 34 further comprising:
automatically providing at least one default punishment.

37. The method of claim 36 further comprising:
receiving, from a user, at least one modification to at least one provided default punishment.

38. The method of claim 33 or claim 34 further comprising:
receiving, from a user, at least one user defined punishment.

39. The method of claim 2 further comprising:
automatically providing at least one default point cost associated with a level.

40. The method of claim 39 further comprising:
receiving, from a user, at least one modification to at least one provided default point cost associated with a level.

41. The method of claim 2 further comprising:
receiving, from a user, at least one user defined point cost associated with a level.

42. The method of claim 3 or claim 34 further comprising:
automatically providing at least one default point cost associated with a feature from a group of features comprising:
a privilege; and
a punishment.

43. The method of claim 42 further comprising:
receiving, from a user, at least one modification to at least one provided default point cost associated with a feature from a group of features comprising:
a privilege; and
a punishment.

44. The method of claim 3 or claim 34 further comprising:
receiving, from a user, at least one user defined point cost associated with a feature from a group of features comprising:
a privilege; and
a punishment.

45. A computer implemented method for inducing desired physical tasks in a subject, the method comprising:
associating at least one desired physical task with a corresponding positive point value;
associating at least one undesired physical task with a corresponding negative point value;
associating a first point threshold with a plurality of positive reward based consequences;
associating a second point threshold with a plurality of negative punishment based consequences;
tracking desired and undesired physical tasks performed by a subject over a fixed period of time;
automatically calculating a single point total based on the desired physical tasks and the undesired physical tasks performed by the subject during the fixed period of time; and
automatically allocating a consequence to the subject based on an average point total for a specified number of periods of time and the consequences previously associated with the average point total, wherein the consequence is allocated responsive to a relationship between the average point total and at least one of the first point threshold and the second point threshold.

46. The method of claim 1 wherein:
at least one desired physical task comprises an incentive, with which a predefined consequence is associated.

47. The method of claim 46 further comprising:
tracking performance of an incentive by the subject; and
automatically outputting information to a user concerning the performance of the incentive by the subject.

48. The method of claim 46 wherein:
at least one predefined consequence associated with at least one incentive comprises automatically adding a specified number of points to the subject's single point total for a specified number of fixed periods of time.

49. The method of claim 46 wherein:
at least one predefined consequence associated with at least one incentive comprises automatically incrementing a subject's earned level for a specified number of fixed periods of time.

50. The method of claim 46 further comprising:
tracking performance of an incentive by the subject; and
automatically applying a predefined consequence associated with the incentive upon tracking performance of the incident by the subject.

51. The method of claim 50 further comprising:
automatically applying a predefined consequence associated with the incentive for at least two fixed periods of times, responsive to the performance of the incentive by the subject.

52. The method of claim 46 wherein:
at least one predefined consequence associated with at least one incentive comprises automatically allocating a privilege to the subject.

53. The method of claim 46 wherein:
at least one predefined consequence associated with at least one incentive comprises automatically allocating at least one token to the subject.

54. The method of claim 18 wherein:
at least one predefined consequence associated with at least one incident comprises automatically taking away at least one token from the subject.

55. A computer implemented method for inducing desired physical tasks in a subject, the method comprising:
a behavior tracking manager tracking desired physical tasks and undesired physical tasks performed by a subject over a fixed period of time, each desired physical task being associated with a positive point value, each undesired physical task behavior being associated with a negative point value, a first point threshold being associated with a plurality of positive reward based consequences, and a second point threshold being associated with a plurality of negative punishment based consequences;

the behavior tracking manager automatically calculating a single point total based on the desired physical tasks and the undesired physical tasks performed by the subject during the fixed period of time; and after the fixed period of time, the behavior tracking manager automatically allocating a consequence to the subject based on the single point total for the fixed period of time, wherein the consequence is allocated responsive to a relationship between the single point total and at least one of the first point threshold and the second point threshold.

56. The method of claim 55 wherein automatically allocating consequences to the subject based on the point total further comprises:

the behavior tracking manager automatically assigning a level to the subject for the subsequent period of time based on the single point total earned during the previous period of time, the level being associated with a corresponding point cost.

57. The method of claim 1, wherein a physical task comprises at least one of: performing a physical action, achieving a result or having a temperament.

58. The method of claim 45, wherein a physical task comprises at least one of: performing a physical action, achieving a result or having a temperament.

59. The method of claim 55, wherein a physical task comprises at least one of: performing a physical action, achieving a result or having a temperament.

* * * * *